United States Patent [19]

Nagase et al.

[11] Patent Number: 4,879,673

[45] Date of Patent: Nov. 7, 1989

[54] METHOD AND DEVICE FOR CORRECTING A FUEL INJECTION QUANTITY IN A DIESEL ENGINE

[75] Inventors: Masaomi Nagase; Yoshiyasu Ito; Mikio Kizaki; Kiyotaka Matsuno, all of Toyota; Keisuke Tsukamoto, Nagoya; Fumiaki Kobayashi, Toyota, all of Japan

[73] Assignee: Toyota Jidosha Kabushiki Kaisha, Japan

[21] Appl. No.: 887,659

[22] Filed: Jul. 21, 1986

[30] Foreign Application Priority Data

Jul. 25, 1985 [JP] Japan ................................ 60-164963

[51] Int. Cl.$^4$ ...................... G06F 15/20; F02M 39/00
[52] U.S. Cl. .......................... 364/571.01; 364/571.04; 364/431.05; 123/479
[58] Field of Search ....................... 364/431.05, 431.06, 364/571; 123/506, 519, 479, 359, 357, 458

[56] References Cited

U.S. PATENT DOCUMENTS

| | | | |
|---|---|---|---|
| 3,699,935 | 10/1972 | Adler et al. ......................... | 123/359 |
| 4,322,800 | 3/1982 | Hisegawa et al. ................... | 123/419 |
| 4,357,662 | 11/1982 | Schira et al. ...................... | 364/431.08 |
| 4,375,668 | 3/1983 | Leung et al. ....................... | 364/431.08 |
| 4,413,508 | 11/1983 | Kawamura et al. ................... | 73/116 |
| 4,450,528 | 5/1984 | Yaegashi et al. ................... | 364/431.05 |
| 4,502,442 | 3/1982 | Takakuwa et al. ................... | 123/419 |
| 4,502,446 | 3/1982 | Kanegae et al. ..................... | 123/479 |
| 4,503,824 | 3/1985 | Ninomiya et al. ................... | 123/419 |
| 4,520,780 | 6/1985 | Ito et al. .......................... | 123/359 |
| 4,590,908 | 5/1986 | Yoshinaga et al. .................. | 123/357 |
| 4,603,668 | 8/1986 | Ueno ................................ | 123/357 |
| 4,603,669 | 8/1986 | Takemoto et al. ................... | 123/357 |
| 4,617,902 | 8/1986 | Hirano et al. ....................... | 123/479 |
| 4,705,000 | 11/1987 | Matsumura et al. ................. | 123/357 |
| 4,714,068 | 12/1987 | Nagase et al. ...................... | 123/357 |
| 4,730,586 | 3/1988 | Yamaguchi et al. ................. | 123/357 |

Primary Examiner—Parshotam S. Lall
Assistant Examiner—Ellis B. Ramirez
Attorney, Agent, or Firm—Oliff & Berridge

[57] ABSTRACT

According to the present invention, when means is provided for correcting a shift in phase of an engine rotation pulse and a dispersion in responses of an electromagnetic spill valve, and a control signal to a fuel injection pump is corrected in response to an output from the correcting means, if abnormality of output from the correcting means is detected, then the control signal to the fuel injection pump is corrected by use of a fixed valve. As a consequence, even when the output from the correcting means is abnormal, neither excessively large nor excessively small correction is performed and the running at the lowest level can be made, preventing the diesel smoke from being deteriorated and the engine from being damaged.

7 Claims, 6 Drawing Sheets

METHOD AND DEVICE FOR CORRECTING A FUEL INJECTION QUANTITY IN A DIESEL ENGINE

BACKGROUND OF THE INVENTION

1. Field of the Invention

This invention relates to a method and device for correcting a fuel injection quantity in a diesel engine, and more particularly to improvements in a method and a device for correcting a fuel injection quantity, being suitable for use in a diesel engine provided with an electromagnetic spill type fuel injection pump, wherein means is provided for correcting a shift in phase of an engine rotation pulse and a dispersion in responses of an electromagnetic spill valve, whereby a control signal to the fuel injection pump is corrected in response to an output from the correcting means.

2. Description of the Prior Art

Along with the development in the electronic control techniques, particularly, the digital control technique in recent years, there has been commercialized the so-called electronic control diesel engine, wherein a fuel injection pump of the diesel engine is electronically controlled.

There are various methods of electronically controlling the fuel injection pump. One of the fuel injection pumps is a so-called electromagnetic spill type fuel injection pump, wherein fuel spill in the fuel injection pump is controlled by an electromagnetic spill valve. In this electromagnetic spill type fuel injection pump, when the fuel injection quantity reaches a target value, a spill port is opened by the electromagnetic spill valve to control the feed end of fuel, so that the fuel injection quantity per stroke can be controlled.

The electromagnetic spill valve is of a normally open type, for example, and on-off controlled by an electronic control unit (hereinafter referred to as an "ECU"), with a spill command angle theta obtained from an accelerator opening, an engine speed and the like, and as referenced from the position of an engine rotation pulse (hereinafter referred to as an "NE pulse"). In this case, as disclosed in U.S. Pat. Nos. 4,413,508 and 4,450,528 or Japanese Patent Laid-open No. 134377/1984, a phase correction resistor (hereinafter referred to as a "theta correction resistor") and a response correction resistor (hereinafter referred to as a "tau correction resistor") for correcting the shift in phase of the NE pulse and the dispersion in response of the electromagnetic spill valve are mounted on the fuel injection pump, for example. Both of the theta correction resistor and the tau correction resistor are adjusted in the shipping stage so that the fuel injection pump can have a standard injection quantity per stroke in its characteristics.

Figure 5:
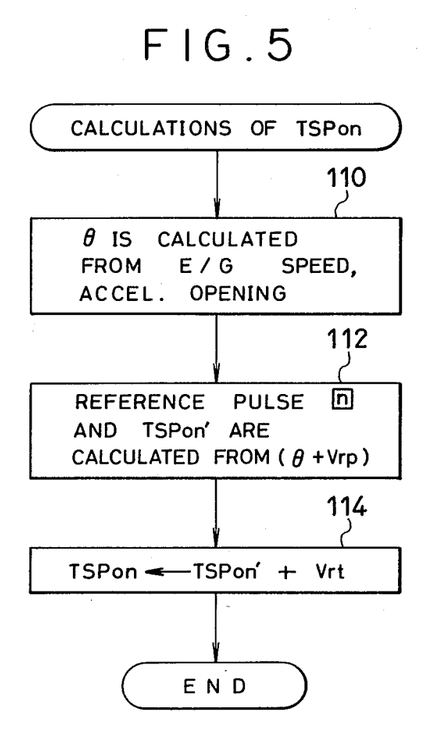
FIG. 5 is a flow chart showing the routine for calculating the time on which the electromagnetic spill valve is turned off in accordance with the engine operating conditions.

In such case as described above, for example, the ECU calculates a timing TSPon on which the electromagnetic spill valve is turned off (spill is on) in accordance with a flow chart shown in FIG. 5 (related art). More specifically, first, in step 110, the spill command angle theta is calculated from the engine speed and the accelerator opening which have been detected. Subsequently, in Step 112, a phase correction value (hereinafter referred to as a "theta correction value") Vrp read in from the theta correction resistor through an analogue-digital conversion, for correcting a change in an injection quantity per stroke due to a press-in shift of an engine rotation pulser (hereinafter referred to as an "NE pulser") and a shift in position of an engine rotation sensor (hereinafter referred to as an "NE sensor") is added to the spill command angle theta so as to obtain a value theta+Vrp(°CA), from which a reference NE pulse No. n (for example, n=2) is calculated and a surplus angle is converted into a time to provide TSPon'. Subsequently, in Step 114, calculations shown in the following formula are performed to obtain a time TSPon for turning the electromagnetic spill valve off.

$$TSPon \leftarrow TSPon' + Vrt \qquad (1)$$

where Vrt is a response correction value (hereinafter referred to as a "tau correction value") read from the tau correction resistor through an analogue-digital conversion, for correcting a change in an injection quantity per stroke due to dispersion in delayed response of the electromagnetic spill valve.

Figure 6:
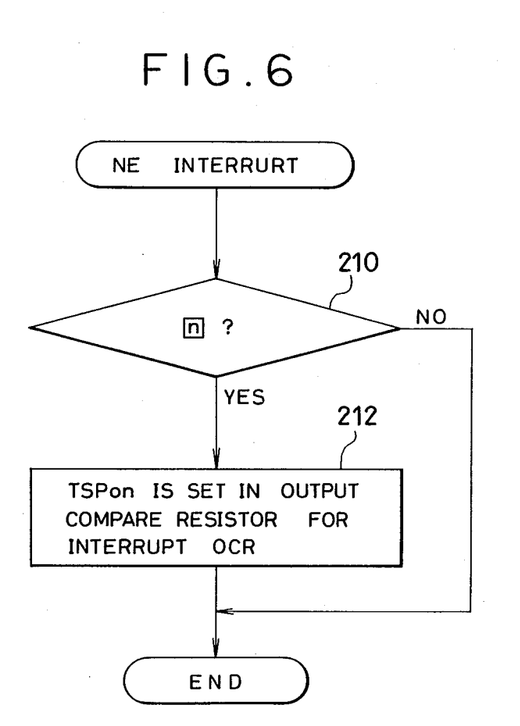
FIG. 6 is a flow chart showing the engine rotation interrupt routine for turning the electromagnetic spill valve off at the time of the engine rotation interrupt.

Subsequently, due to an interrupt by NE pulse, the process enters an NE interrupt routine as shown in FIG. 6 (related art), and, in Step 210 thereof, judgment is made as to whether No. n of NE pulse reaches or not. When the result of judgement is positive, the rountine proceeds to Step 212, where Tspon, which has been calculated in the Step 114, is set in an output compare resistor for interrupt OCR, thus completing this routine.

Figure 7:
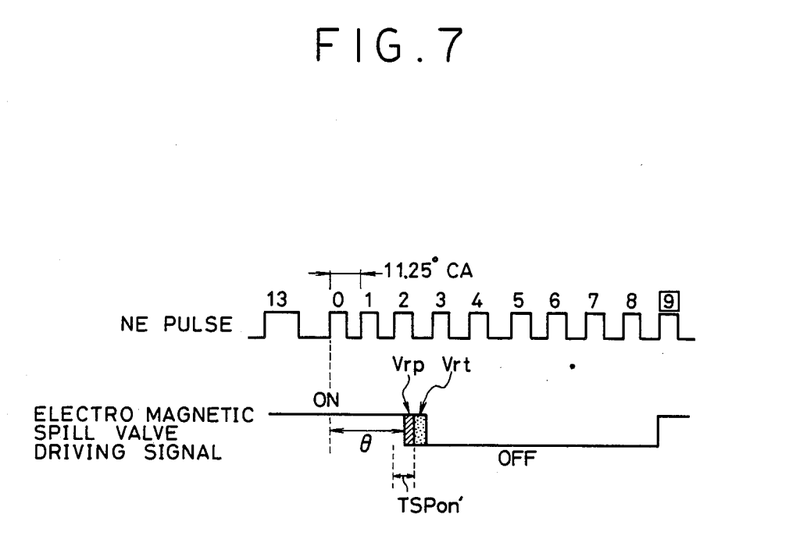
FIG. 7 is a chart showing an example of the relationship between the engine rotation pulse and the on-off conditions of the electromagnetic spill valve.

Thus, as shown in FIG. 7 (related art), upon reaching of NE pulse No. n (=2), the electromagnetic spill valve, which has been turned on, is turned off after TSPon, and the spill is performed, whereby the fuel injection is stopped.

However, when the theta correction resistor and the tau correction resistor are disconnected or short-circuited to a plus voltage side of a battery, the theta correction value Vrp and the tau correction value Vrt become excessively large, whereby the fuel injection quantity becomes excessively large, so that the diesel smoke is produced in large quantity, and moreover, the exhaust temperature and the temperature in the combustion chamber are raised, thus possibly resulting in a damaged engine.

Furthermore, to the contrary, when the theta and the tau correction resistors are short-circuited to the earth, the correction values become excessively small, whereby the fuel injection quantity becomes excessively small, so that there is a possibility of the vehicle unabling to run.

SUMMARY OF THE INVENTION

The present invention has been developed to obviate the above-described disadvantages of the prior art and has as it object the provision of a method and a device for correcting a fuel injection quantity in a diesel engine, in which the diesel smoke is prevented from deteriorating and the engine is prevented from being damaged regardless of the troubles of the theta correction resistor, the tau correction resistor and the like, so that at least the lowest level of the operation is made possible.

Figure 1:
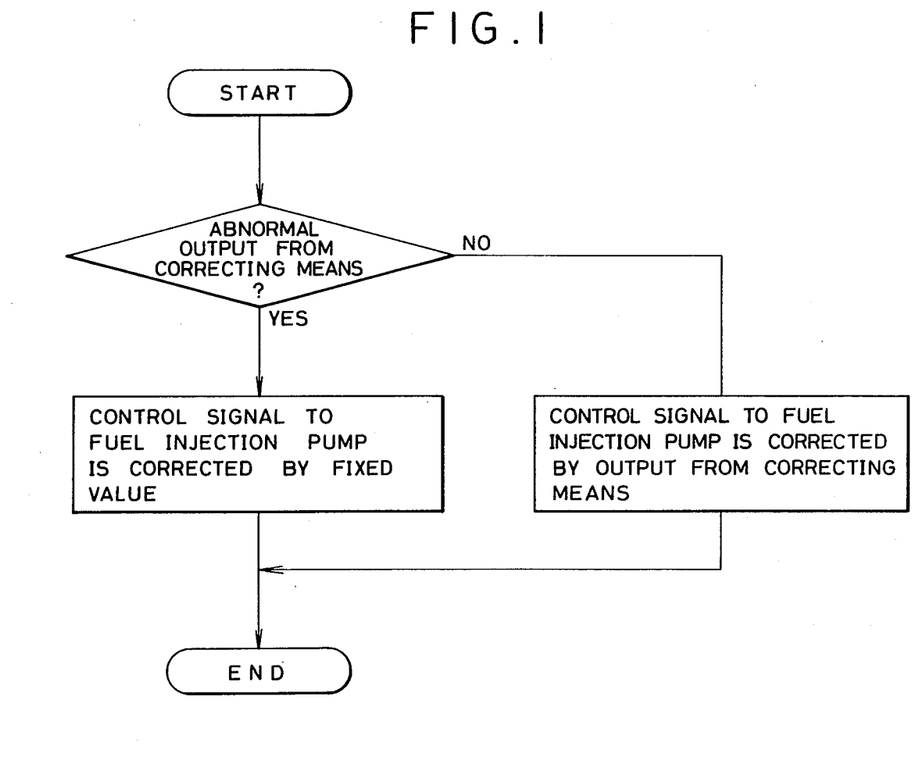
FIG. 1 is a flow chart showing the technical gist of the method of correcting the fuel injection flow rate in a diesel engine according to the present invention.

To achieve the above-described object, the present invention contemplates in a method of correcting a fuel injection quantity in a diesel engine, wherein means are provided for correcting a shift in NE pulse and a dispersion in responses of an electromagnetic spill valve and a control signal to a fuel injection pump is corrected in response to an output from the correcting means, as the technical gist is shown in FIG. 1, said method comprising the steps of: detecting an abnormal output from the correcting means and correcting a control signal to the fuel injection pump by use of a fixed value when the output from the correcting means is abnormal.

A specific embodiment of the present invention is of such an arrangement that the correcting means includes the theta correction resistor for correcting the change in the injection quantity per stroke due to the press-in shift of the NE pulser and the shift in position of the NE sensor and the tau correction resistor for correcting the change in the injection quantity per stroke due to the dispersion of the delayed responses of the electromagnetic spill valve.

Another specific embodiment of the present invention is of such an arrangement that the abnormal output from the correcting means is detected from the fact that the conditions of output from the correcting means are beyond a normal range continued more than a preset number of times.

A further specific embodiment of the present invention is of such an arrangement that the fixed value is made to be a value close to the lower limit value of the dispersion of the outputs from the correcting means.

According to the present invention, when the means is provided for correcting the shift in phase of the NE pulse and the dispersion in responses of the electromagnetic spill valve, and a control signal to the fuel injection pump is corrected in response to an output from the correcting means, if an abnormal output from the correcting means is detected, then the control signal to the fuel injection pump is corrected by the fixed value. As a consequence, when the abnormal output from the correcting means occurs, neither excessively large nor excessively small correction is performed, the diesel smoke can be prevented from deteriorated and the engine can be prevented from being damaged, thus enabling to perform the driving at least at the lowest level.

When the correcting means includes the theta correction resistor for correcting the change in the injection quantity per stroke due to the press-in shift of the NE pulser and the shift in position of the NE sensor and the tau correction resistor for correcting the change in the injection quantity per stroke due to the dispersion in responses of the electromagnetic spill valve, the correction in phases and the correction in the responses can be precisely carried out.

When the abnormal output from the correcting means is detected from the fact that the conditions of output from the correcting means are beyond a normal range continued more than a preset number of times, the abnormal output from the correcting means can be precisely detected.

When the fixed value is made to be a value close to the lower limit value of the dispersion of the outputs from the correcting means, the engine can be prevented from being damaged and the running at the lowest level can be assured even if the correcting means is out of order.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENT

The embodiment of the electronic control diesel engine for a motor vehicle, to which the method of correcting the fuel injection quantity according to the present invention is adapted, is described in detail with reference to the accompanying drawings.

Figure 2:
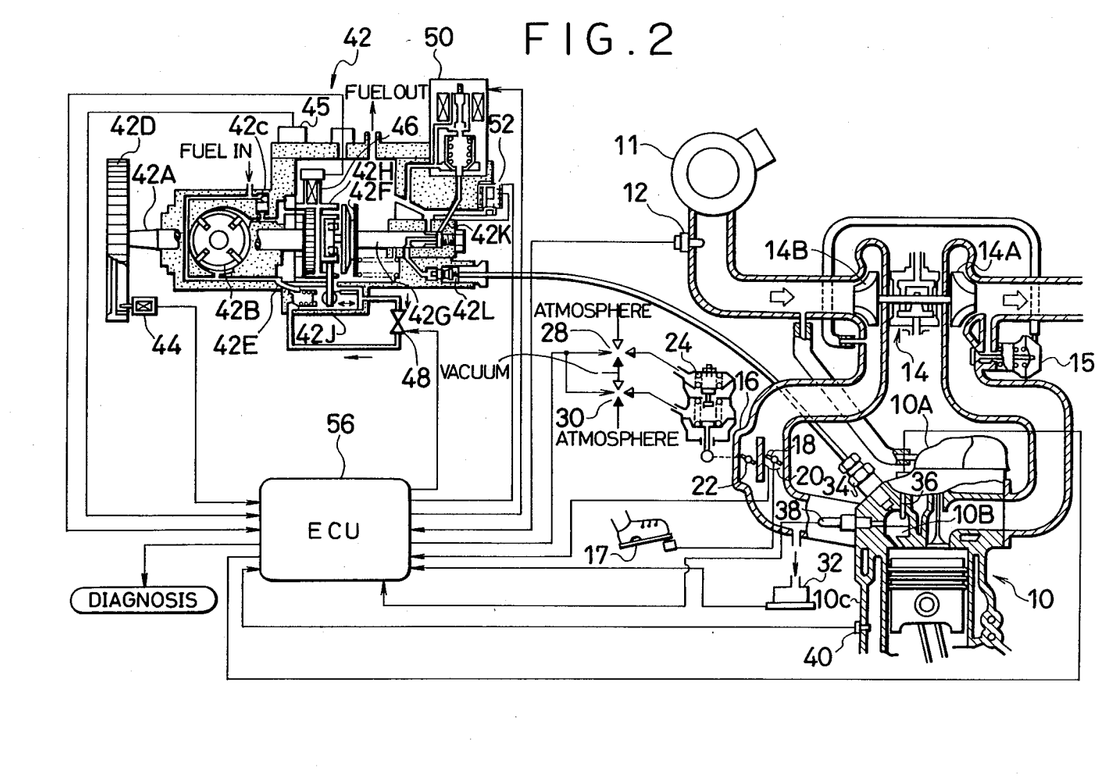
FIG. 2 is a sectional view, partly including a block diagram, showing the general arrangement of an embodiment of the electronic control diesel engine for a motor vehicle, to which the present invention is adapted.

FIG. 2 shows an embodiment of the present invention in which an intake-air temperature sensor 12 for detecting intake-air temperature is provided at the downstream side of an air cleaner 11. Provided at the downstream side of the intake-air temperature sensor 12 is a turbo charger 14 including a turbine 14A rotatable by heat energy of the exhaust gas and compressor 14B rotatable in operational association with this turbine 14A. The upstream side of the turbine 14A of the turbocharger 14 and the downstream side of the compressor 14B communicate with each other through a waste gate valve 15 to prevent intake-air pressure from being raised excessively high.

Provided in a venturi 16 disposed at the downstream side of the compressor 14B is main intake-air throttle valve 18 rotatable non-linearly in operational association with an accelerator pedal 17, so as to restrict an intake-air quantity during idling and the like. The opening angle Accp of the accelerator pedal 17 (hereinafter referred to as a "accelerator opening") is detected by an accelerator position sensor 20.

Provided in parallel to the main intake-air throttle valve 18 is an auxiliary intake-air throttle valve 22, the opening of which is controlled by a diaphragm device 24. Supplied to the diaphragm device 24 is a vacuum generated in a vacuum pump, not shown, through a vacuum switching valve (hereinafter referred to as a "VSV") 28 or 30.

Provided at the downstream side of the intake-air throttle valves 18 and 22 is in intake-air pressure sensor 32 for detecting intake-air pressure.

A cylinder head 10A of a diesel engine 10 is provided with an injection nozzle 34, a glow plug 36 and an ignition timing sensor 38, the forward ends of which are located in an engine combustion chamber 10B. Furthermore, provided on a cylinder block 10C of the diesel engine 10 is a water temperature sensor 40 for detecting the temperature of engine cooling water.

Fuel is fed under pressure to the injection nozzle 34 from an injection pump 42.

The injection pump 42 includes a pump driving shaft 42A rotatable in operational association with the rotation of a crankshaft of the diesel engine 10; a feed pump 42B (FIG. 2 shows a state in which the pump is developed through 90°) secured to the pump driving shaft 42A to pressurize the fuel; a fuel pressure regulating valve 42C for regulating fuel feed pressure; a reference position sensor 44 such as an electromagnetic pickup for detecting a crank angle reference position of the engine such as top dead center (TDC) from a displacement in rotation of a pump driving pulley 42D secured to the pump driving shaft 42A; correction resistors 45 including a theta correction resistor for mainly correcting a shift in the mounted position of the reference position sensor 44 and a tau correction resistor for mainly electrically correcting a dispersion in delayed response of the electromagnetic spill valve 50; an NE sensor 46 such as an electromagnetic pickup secured to a roller ring 42H for detecting an engine rotation angle and missing tooth position from a displacement in rotation of an NE pulser 42E secured to the driving shaft 42A; the roller ring 42H for reciprocating a face cam 42F and a plunger 42G and varying the timing thereof; a timer piston 42J (FIG. 2 shows a state in which the timer piston is developed through 90°) to vary a rotary position of the roller ring 42H; a timer control valve (hereinafter referred to as a "TCV") 48 for controlling the position of the timer piston 42J to control the injection timing; an electromagnetic spill valve 50 for varying fuel relief timing from the plunger 42G through a spill port 42K to control the fuel injection quantity; a fuel cut valve (hereinafter referred to as an "FCV") 52 for cutting the fuel when abnormality occurs; and a delivery valve 42L for preventing back flow and after-dripping of the fuel.

Outputs from the intake-air temperature sensor 12, the accelerator position sensor 20, the intake-air pressure sensor 32, the ignition timing sensor 38, the water temperature sensor 40, the reference position sensor 44, the correction resistor 45, the NE sensor 46, a key switch, an air conditioner switch, a neutral safety switch and a vehicle speed signal are inputted to and processed in an electronic control unit (hereinafter referred to as an "ECU") 56. The VSV 28, 30, and TCV 48, the electromagnetic spill valve 50 and the FCV 52 are controlled by outputs from the ECU 56.

Figure 3:
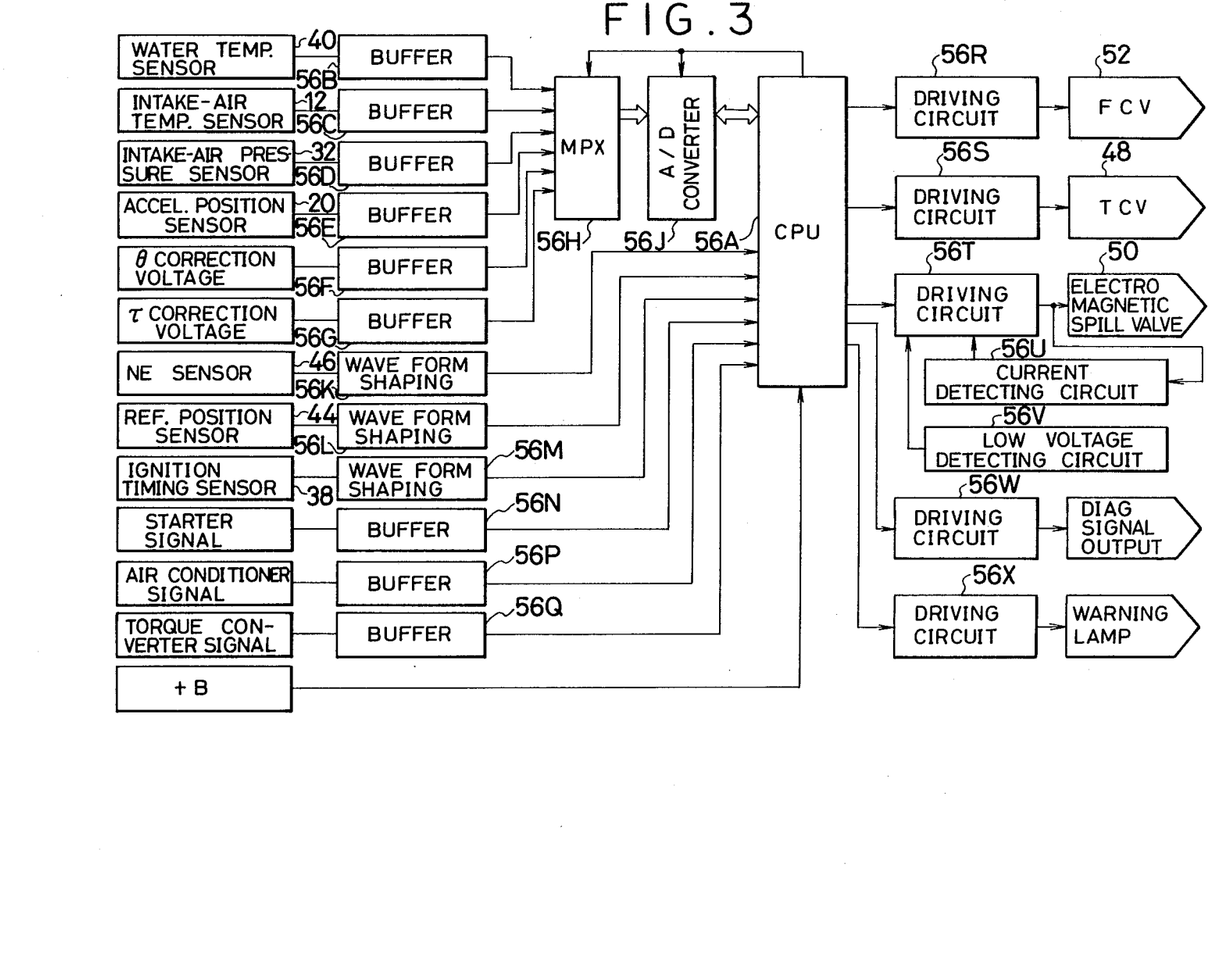
FIG. 3 is a block diagram showing the arrangement of the electronic control unit used in the above embodiment.

As shown in FIG. 3, the ECU 56 includes: a central processing unit (hereinafter referred to as a "CPU") 56A for performing various calculation processing; a multiplexer (hereinafter referred to as a "MPX") 56H for succesively taking in an output from the water temperature sensor 40, which is inputted through a buffer 56B, an output from the intake air temperature sensor 12, which is inputted through a buffer 56C, an output from the intake-air pressure sensor 32, which is inputted through a buffer 56D, an output from the accelerator position sensor 20, which is inputted through a buffer 56E, a theta correction value Vrp inputted through a buffer 56F and a tau correction value Vrt-inputted through a buffer 56G; an analog-digital converter (hereinafter referred to as an "A/D converter") 56J for converting analog signals outputted from the MPX 56H into digital signals and inputting the same into the CPU 56A; a wave form shaping circuit 56K for wave form shaping an output from the NE sensor 46 and inputting the same into the CPU 56A; a wave form shaping circuit 56L for wave form shaping an output from the reference position sensor 44 and inputting the same into the CPU 56A; a wave form shaping circuit 56M for wave form shaping an output from the ignition timing sensor 38 and inputting the same into the CPU 56A; a buffer 56N for inputting a starter signal into the CPU 56A; a buffer 56P for inputting an air conditioner signal into the CPU 56A; a buffer 56Q for inputting a torque converter signal into the CPU 56A; a driving circuit 56R for driving the FCV 52 in accordance with the result of calculations by the CPU 56A; a driving circuit 56S for driving the TCV 48 in accordance with the result of calculations by the CPU 56A; a current driving circuit 56T for driving the electromagnetic spill valve 50 in accordance with the result of calculations by the CPU 56A; a current detecting circuit 56U for detecting a current flowing through the electromagnetic spill valve 50 and feeding-back the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the result of calculations by the CPU 56A; and a driving circuit 56X for driving a warning lamp in accordance with the result of calculations by the CPU 56A.

Description will hereunder be given of action of one embodiment.

Figure 4:
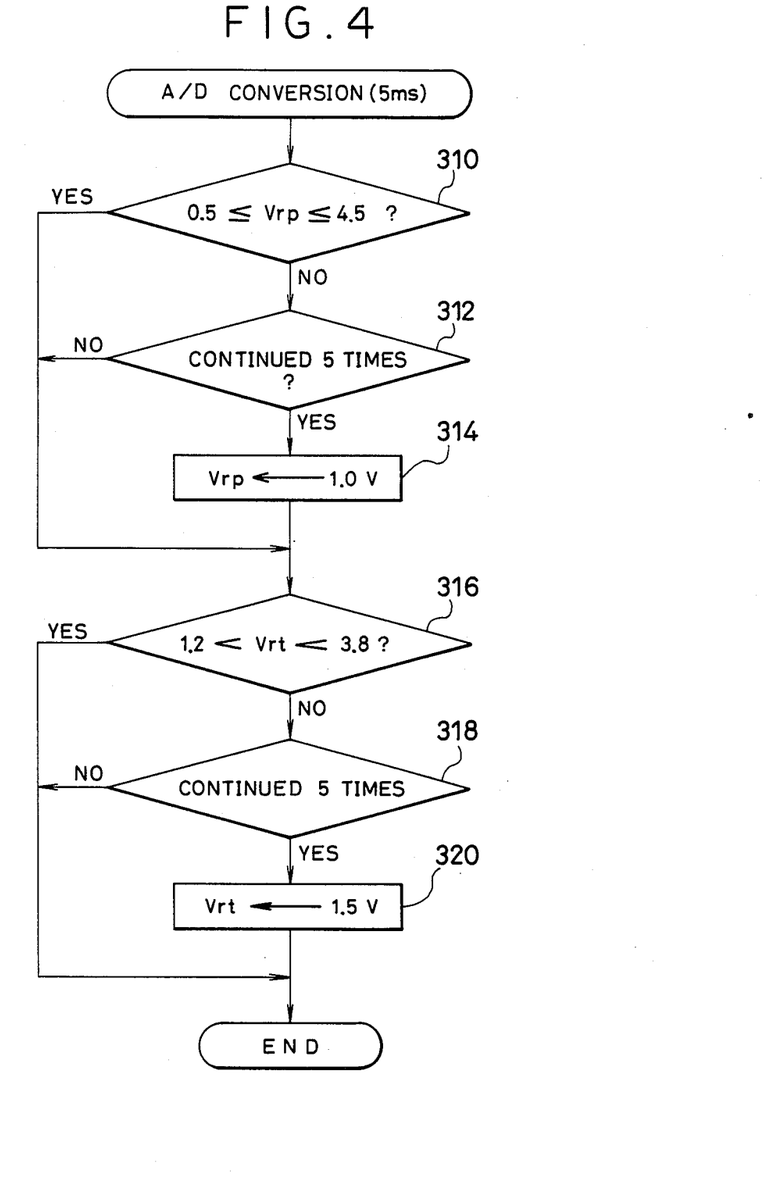
FIG. 4 is a flow chart showing the essential portions of the analogue-digital conversion routine for fixing the output from the correcting means according to the present invention.

In this embodiment, the analogue-digital (hereinafter referred to as an "A/D") conversion when the theta correction value Vrp and the tau correction value Vrt are inputted into the CPU 56A is carried out in accordance with a flow chart as shown in FIG. 4.

More specifically, the routine enters Step 310 with an A/D conversion cycle 5 ms for example, where judgement is made as to whether the theta correction value Vrp is within a normal range of 0.5V–4.5V for example or not. When the result of judgment is negative, the routine proceeds to Step 312, where judgment is made whether the aforesaid condition continued more than a predetermined number of times, e.g. 5 times or not. When the result of judgment is positive and it is judged that the theta correction value Vrp is abnormal, the routine proceeds to Step 314, a fixed value 1.0 V belonging to the substantially lower limit of the range of about 1.0V–4.5V of the standard deviation 3 sigma of the dispersion of the theta correction value Vrp is inputted to the theta correction value Vrp. With this arrangement, even if the A/D conversion value of the theta correction value Vrp is abnormal, the running at the lowest level can be made without deteriorating the diesel smoke and damaging the engine.

Alternatively, when the result of judgment in Step 310 is positive or the result of judgment in Step 312 is negative, the A/D conversion value of the theta correction value Vrp is used as it is, for the control.

Subsequently, the routine proceeds to Step 316, where judgment is made whether the tau correction value Vrt is within a normal range, e.g. 1.2V–3.8V or not. When the result of judgment is negative, the routine proceeds to Step 318, where judgment is made whether the aforesaid condition continues more than a preset number of times, e.g. 5 times or not. When the result of judgment is positive and the tau correction value Vrt is abnormal, the routine proceeds to Step 320, where the tau correction value Vrt is made to be a rather small value, e.g. 1.5V within the range of the dispersion thereof.

Alternatively, when the result of judgement in Step 316 is positive or the result of judgment in Step 318 is negative, the tau correction value Vrt, which has been A/D converted, is used as it is, for the control.

Thus, when the theta correction value Vrp or/and the tau correction value Vrt are abnormal, the values thereof are fixed to preset values of Vrp=1.0V or/and Vrt=1.5V, whereby, when an abnormality occurs, the running at the lowest level can be made without deteriorating the diesel smoke and damaging the engine.

In this embodiment, the correcting means includes the theta correction resistor for correcting the change in the injection quantity per stroke due to the press-in shift of the NE pulser 42E and the shift in position of the NE sensor 46 and the tau correction resistor for correcting the change in the injection quantity per stroke due to the dispersion of the delayed responses of the electromagnetic spill valve 50, so that the shifts of theta and tau can be reliably corrected. Additionally, the type of correcting means, to which the present invention is applied, need not necessarily be limited to these.

Furthermore, in this embodiment, the abnormalities of the theta correction value Vrp and of the tau correction value Vrt are detected from the fact that the condition, where these values are beyond the normal range, continued more than 5 times, so that the abnormalities of the theta and the tau correction values Vrp and Vrt can be precisely detected. Additionally, the method of detecting the abnormal outputs from the correcting means need not necessarily be limited to this.

Furthermore, in this embodiment, the fixed values are made to be the values close to the lower limit value of the dispersion of the outputs from the correcting means, so that the running at the lowest level can be assured without damaging the engine. Additionally, the fixed values need not necessarily be limited to this.

What is claimed is:

1. A method of correcting a fuel injection quantity in a diesel engine, comprising correcting a shift in an engine rotation pulse and dispersion of responses of an electromagnetic spill valve by correcting means which provide a fixed output, correcting a control signal to a fuel injection pump in response to said fixed output from said correcting means, detecting abnormal outputs from said correcting means; and correcting a control signal to said fuel injection pump by use of a fixed value when the output from said correcting means is abnormal.

2. A method of correcting a fuel injection quantity in a diesel engine as set forth in claim 1, wherein said correcting means includes:

a phase correction resistor for correcting a change in an injection quantity per stroke due to a press-in shift of an engine rotation pulser and a shift in position of an engine rotation sensor; and a response correction resistor for correcting a change in an injection quantity per stroke due to a dispersion of delayed responses of the electromagnetic spill valve.

3. A method of correcting a fuel injection quantity in a diesel engine as set forth in claim 1, wherein said correcting means is a phase correction resistor for correcting a change in an injection quantity per stroke due to a press-in shift of an engine rotation pulser and a shift in position of an engine rotation sensor.

4. A method of correcting a fuel injection quantity in a diesel engine as set forth in claim 1, wherein said correcting means is a response correction resistor for correcting a change in an injection quantity per stroke due to a dispersion of delayed responses of an electromagnetic spill valve.

5. A method of correcting a fuel injection quantity in a diesel engine as set forth in claim 1, wherein abnormality of output from said correcting means is detected from the fact that the conditions of output from said correcting means are beyond a normal range continued more than a preset number of times.

6. A method of correcting a fuel injection quantity in a diesel engine as set forth in claim 1, wherein said fixed value is made to be a value close to the lower limit value of the dispersion of output from said correcting means.

7. A device for correcting a fuel injection quantity in a diesel engine, comprising means for correcting a shift in an engine rotation pulse and a dispersion of responses of an electromagnetic spill valve such that a control signal to a fuel injection pump is corrected in response to a fixed output from said correcting means, means for detecting abnormal output from said correcting means; and means for correcting a control signal to said fuel injection pump by use of a fixed value when the output from said correcting means is abnormal.

* * * * *